Oct. 6, 1931.  F. HOTCHNER  1,825,799
LUMINOUS DISPLAY
Filed March 11, 1931
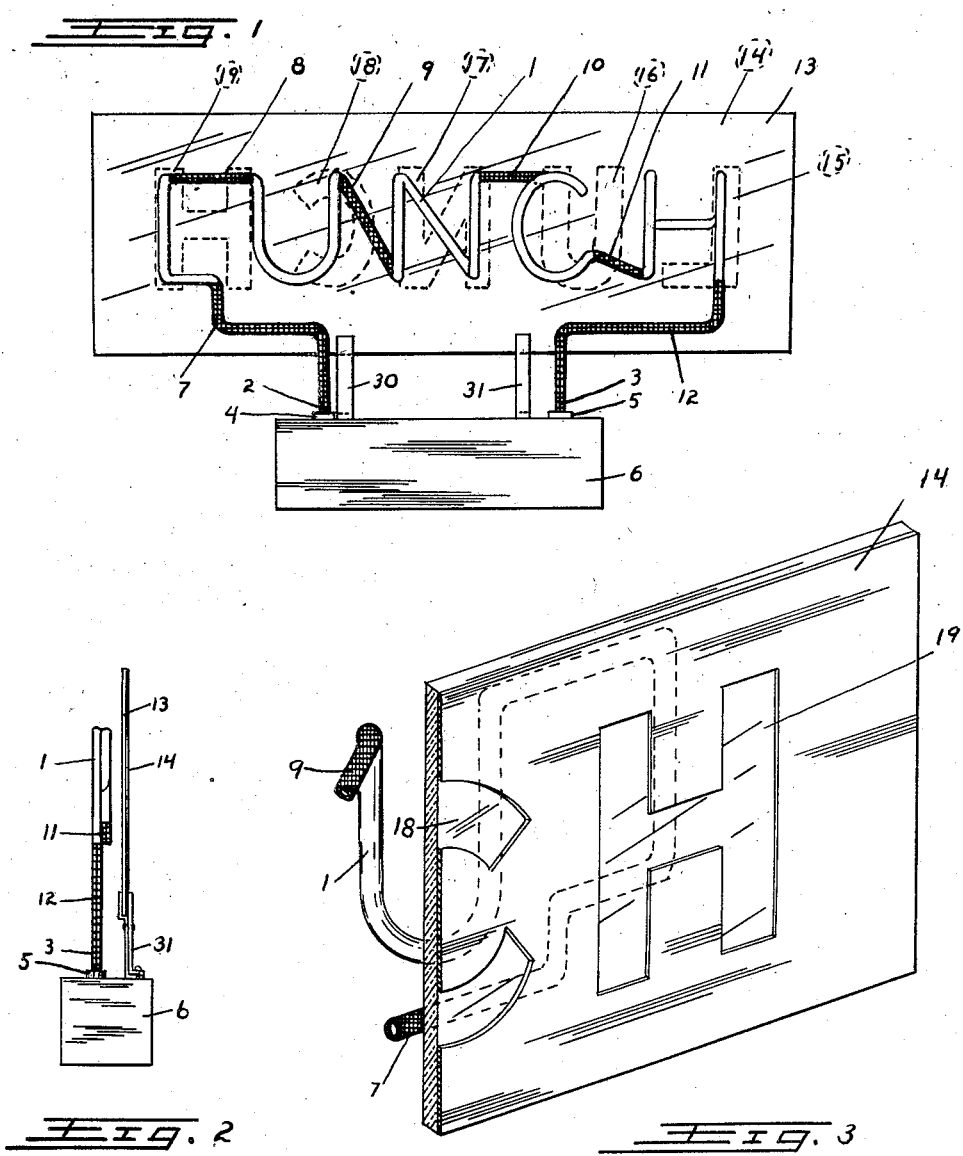
INVENTOR
Fred Hotchner Patented Oct. 6, 1931

1,825,799

UNITED STATES PATENT OFFICE

FRED HOTCHNER, OF LOS ANGELES, CALIFORNIA

LUMINOUS DISPLAY

Application filed March 11, 1931. Serial No. 521,754.

This invention relates to a luminous display and the object thereof is to provide a luminous tube inscription display having in connection with a luminous tube in the form of an inscription reading in one direction a transparent display element reading in the opposite direction and illuminated by a portion of the radiation from the tube. This invention provides a doubled faced sign with the same tubing ordinarily sufficing only for a single faced sign. It also provides an effective background for the tubing in the normal direction of view of the same.

This invention may be variously embodied in displays. By way of illustration a table mounting sign is shown in the drawings, but it is to be understood that the invention is not limited by any of the details of construction beyond those limitations implied in the final claims in the broadest aspect of the combination of a luminous tube display element and a transparent display element.

In the drawings, Figure 1 is an elevation of a table mounting sign. Figure 2 is a side view of the same. Figure 3 is a perspective view of a portion of the device to show the relation of the two display elements.

Numeral 1 indicates a luminous tube in the form of the word "Lunch" having two terminals 2 and 3 which extend into suitable terminal housings 4 and 5 in the transformer box 6 which serves as the base of the device. Portions of the tube indicated by numerals 7, 8, 9, 10, 11 and 12 are rendered opaque by paint or any other suitable means so that only those portions in the form of the desired inscription are luminous to the eye. Behind the tube 1, and preferably spaced a short distance therefrom is a light transmitting sheet 13 which is supported by the brackets 30 and 31 from the box 6. This sheet may be of glass or any other suitable light transmitting material and preferably should have the property of diffusing radiation passing thru it. Opalescent glass is very suitable for this purpose and when it is used the portions of the tube which have been rendered opaque should be finished in white paint so as to be inconspicuous against the background.

The sheet 13 is provided with means to alter the radiation passing therethru to represent a display pattern thereby to view in the direction opposite to the normal direction of view of the tube. In the embodiment of the invention shown this means takes the form of a stencil member 14 which allows radiation to pass only thru the areas indicated by 15, 16, 17, 18 and 19 to delineate a sign similar to that represented by the tube. Numerous other methods may be used to alter the radiation passing thru the sheet, and any desired display pattern may be represented instead of the same reading matter outlined by the tube. The distance between the tube and the sheet should be so selected that with reference to the translucent portions of the sheet and the degree of diffusion of the light passing therethru the position of the various portions of the tube is substantially unapparent to the eye thru the sheet.

The term "display pattern" as used herein, is to be understood as including any letter, symbol, character, ornament or design, or any combination of such devices, and refers as well when so used to the elements of the invention having the form of any of such devices.

In my co-pending application Serial No. 517,728 filed February 24, 1931, I claim broadly a gaseous conduction tube in the form of a display pattern, the illumination from which may be utilized to represent luminous displays in opposite directions.

The invention may be variously embodied in luminous displays within the purview of the claims and is to be limited only by the prior art and the limitations imposed by the claims.

Having thus described my invention, what I claim is:

1. A luminous display comprising an illuminant in the form of a display pattern exposed directly to view in one direction and a light transmitting display member positioned in relation to said illuminant to form a background therefor and to represent a second display pattern in the opposite direction by transillumination from said illuminant.

2. A luminous display comprising an illuminant in the form of a display pattern exposed directly to view in one direction and a light transmitting and diffusing display member positioned in relation to said illuminant to form a background therefor and be transilluminated by radiation therefrom, and means to alter the radiation passing thru said display member to delineate a second display pattern in the opposite direction.

3. A luminous display comprising an illuminant in the form of a display pattern exposed directly to view in one direction and a light transmitting and diffusing display member positioned in relation to said illuminant to form a background therefor and be transilluminated by radiation therefrom; and stencil means to delineate a second display pattern in the opposite direction, the said illuminant and said display member being spaced apart a distance such that the outline of said illuminant is substantially unapparent to the eye thru said display member.

4. In a display, a luminous tube in the form of a display pattern and a transparency display member in such relation to said tube as to form a background therefor when viewed from the normal direction of view of said tube and be transilluminated by a portion of the radiation therefrom, said transparency display member being provided with means to delineate a second display pattern in the opposite direction.

5. In a display, a luminous tube in the form of a display pattern and a sheet of light transmitting and diffusing material positioned in relation to said tube to form a background therefor with regards to the normal direction of view of said tube and be transilluminated by a portion of the radiation therefrom and means in connection with said sheet to delineate a second display pattern in the opposite direction.

6. In a display, a luminous tube in the form of a display pattern and a sheet of light transmitting and diffusing material positioned in relation to said tube to form a background therefor with regards to the normal direction of view of said tube and be transilluminated by a portion of the radiation therefrom and stencil means in connection with said sheet to delineate a second display pattern in the opposite direction.

7. In a display, a luminous tube in the form of a display pattern and a sheet of light transmitting and diffusing material positioned in relation to said tube to form a background therefor with regards to the normal direction of view of said tube and be transilluminated by a portion of the radiation therefrom and stencil means in connection with said sheet to delineate a second display pattern in the opposite direction, the distance between said tube and said sheet being such that the outline of said sheet is substantially unapparent to the eye thru said stencil and said sheet.

8. In a display, a luminous tube in the form of a display pattern and a sheet of opalescent glass in spaced relation thereto and forming a background therefor and stencil means in connection with said glass to delineate a second display pattern in the direction opposite to the showing of said tube by means of that portion of the radiation from said tube transmitted thru said glass.

9. In a display, a luminous tube in the form of a display pattern and a sheet of opalescent glass in spaced relation thereto and forming a background therefor and stencil means on the side of said glass opposite said tube to delineate a second display pattern in the opposite direction.

10. In a display, a luminous tube in the form of a display pattern and a sheet of opalescent glass in cooperative relation thereto and forming a background therefor and means on said glass to delineate a second display pattern in the opposite direction.

11. A discharge tube in the form of a display pattern visible from one direction and a member pervious to light and provided with a display character disposed back of said tube from the direction in which the tube is visible to be transilluminated by a portion of the direct radiation from said tube other than that portion transmitted directly in the usual direction of view of said tube.

12. A discharge tube in the form of a display pattern visible from one direction and a member pervious to light and provided with a display character disposed back of said tube from the direction in which the tube is visible to be transilluminated by a portion of the direct radiation from said tube transmitted in the opposite direction to the usual direction of view of said tube.

Signed at Chicago, Illinois, this 9th day of March, 1931.

FRED HOTCHNER.